United States Patent
Vandenberg et al.

(10) Patent No.: US 6,244,511 B1
(45) Date of Patent: Jun. 12, 2001

(54) HAND-HELD BARCODE READER RECEPTACLE, BASE MEMBER AND METHOD OF READING BARCODES

(75) Inventors: Mark A. Vandenberg, Appleton; Paul S. Trefren, Neenah; Bruce D. Heling, Appleton, all of WI (US)

(73) Assignee: Appleton Papers Inc., Appleton, WI (US)

( * ) Notice: Subject to any disclaimer, the term of this patent is extended or adjusted under 35 U.S.C. 154(b) by 0 days.

(21) Appl. No.: 09/326,674

(22) Filed: Jun. 7, 1999

(51) Int. Cl.[7] .............................. G06K 7/10; G06K 9/22

(52) U.S. Cl. .............................. 235/462.45; 235/462.43; 235/483

(58) Field of Search .................. 235/462.45, 262.01, 235/462.25, 462.43, 462.44, 472.01, 485, 483

(56) References Cited

U.S. PATENT DOCUMENTS

| | | | |
|---|---|---|---|
| 4,445,028 | * | 4/1984 | Huber ........................ 235/472.01 |
| 5,063,508 | * | 11/1991 | Yamada et al. ............. 235/472.01 |
| 5,739,520 | * | 4/1998 | Atsumi et al. .................... 235/483 |
| 6,027,023 | * | 2/2000 | Nada ............................ 235/462.25 |
| 6,036,094 | * | 3/2000 | Goldman et al. .......... 235/462.25 |

* cited by examiner

*Primary Examiner*—Karl D. Frech
*Assistant Examiner*—Daniel St. Cyr

(57) ABSTRACT

A hand-held barcode reader apparatus has a hand-held body with an elongated hole for receiving a barcode reader. A ski-member is mounted to the hand-held body to allow the apparatus to slide smoothly over a media aligned along a base member. The base member has upper and lower members and a flappable member with a runway being defined in the upper and flappable members. A flat surface of the runway stably holds the hand-held body in position thus allowing an accurate read of a media held between the flappable member and lower member the base member.

23 Claims, 3 Drawing Sheets

HAND-HELD BARCODE READER RECEPTACLE, BASE MEMBER AND METHOD OF READING BARCODES

BACKGROUND OF THE INVENTION

1. Field of the Invention

The present invention generally relates to a hand-held barcode reader apparatus, a base member for holding media with barcode indicia and a method for using the apparatus to scan the barcode indicia.

2. Description of the Background Art

Various barcode scanning devices are known in the art. These barcode scanning devices provide apparatuses capable of scanning barcode disposed on various media sources. However, these barcode scanning devices are unable to scan barcode indicia in a consistent manner. Therefore, in a test environment, consistent test results cannot be obtained. The devices of the prior art allow lateral movement or tilting of a barcode reader during a scan of barcode indicia positioned on a flat surface. It is therefore impossible to maintain a consistent test environment for scanning barcode indicia disposed on a media.

Industries, in particular those relating to paper products and the production thereof, require a means for the testing of various printed characters, including barcode indicia, but the apparatuses and methods of the prior art fail to provide a consistent reliable facility for scanning of barcode indicia having various print strengths printed on a paper media. In the process of testing the barcode indicia, the devices of the prior art wobble, scan at various heights and angles and/or move laterally with respect to the barcode indicia, thus, making it difficult to obtain consistent test characteristics of the scanned barcode indicia.

Accordingly, a need in the art exists for a hand-held barcode reader apparatus having the capability to scan barcode indicia in a consistent and reliable manner. Specifically, a hand-held barcode reader apparatus is needed which is adaptable to various bar code readers and capable of scanning various barcode indicia in a consistent and reliable manner moreover, the tip of the barcode reader should be maintained at a predetermined height and angle while preventing lateral tipping movement during scanning of the barcode indicia.

SUMMARY OF THE INVENTION

Accordingly, it is a primary object of the present invention to provide a hand-held barcode reader apparatus which is held in essentially a horizontal position during scanning of an object.

It is a further object of the present invention to provide a method for scanning barcode indicia disposed on a media in a consistent and reliable manner and wherein repeated scannings can be consistently and accurately carried out.

Another object of the present invention is to provide a base member for stably holding an object during scanning of a barcode thereon.

It is further an object of the present invention to provide a hand-held barcode reader which will not wobble during barcode scanning to thereby provide an accurate barcode reading.

It is additionally a further object of the present invention to provide a hand-held body barcode reader which is comfortable to a hand of a user.

Yet another object of the invention is to provide a hand-held barcode reader receptacle which will retain the barcode reader at a predetermined position and angle above barcode to be read.

These and other objects of the present invention are fulfilled by providing a receptacle, the receptacle having a hand-held body; an elongated hole in the hand-held body for receiving a scanning member therein, and a ski-member attachable to said hand-held body, said ski-member having a bottom surface, the hand-held body being slidably movable along a support surface, said bottom surface of the ski-member laterally supporting the hand-held body to prevent wobbling of the hand-held body relative to the support surface during sliding thereof, whereby said ski-member supportably holds said hand-held body in essentially a level position.

In addition, these and other objects of the present invention are also accomplished by a method of providing a base member with a lower member and a flappable member pivotally mounted thereon; placing a media having barcode indicia thereon on the lower member of the base member the flappable member being in an open position; closing the flappable member of said base member to retainably hold said media in place between the lower member and the flappable member; placing a barcode reader apparatus on a runway surface disposed in said base member; sliding said barcode reader apparatus along said runway surface to read said media; and reading the barcode indicia with the barcode reader apparatus during sliding of the barcode reader apparatus along the runway surface.

Additionally, these and other objects of the present invention are fulfilled by providing a base member for a hand-held barcode reader receptacle having a lower member; an upper member being mounted on said lower member; and a flappable member pivotally attached to said upper member, at least said flappable member and said upper member having an opening formed therein which forms a runway for guiding movement of a barcode reader.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
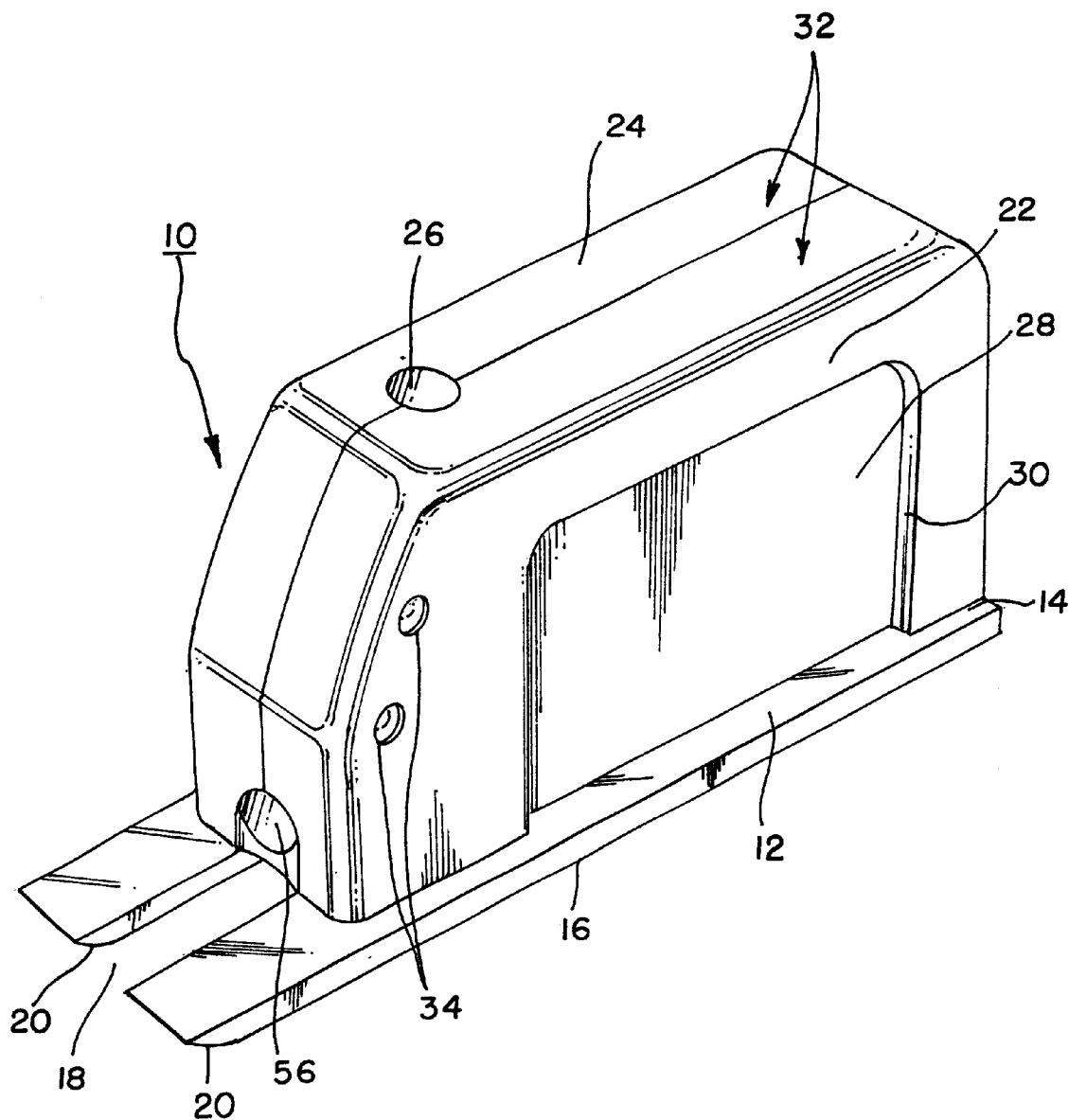
FIG. 1 shows a perspective view of the hand-held barcode reader apparatus of the present invention with the barcode reader having been removed.

Referring in detail to the drawings and with particular reference to FIG. 1, a hand-held barcode reader receptacle 10 is shown. The receptacle 10 includes a ski-member 12 attached to a bottom surface 14 thereof. The ski-member 12 may be attached to the receptacle 10 using a variety of attaching devices well known in the art, e.g., with screws, glue, epoxy or the like. Ski-member 12 has a flat, bottom surface 16 and a cutout front opening 18 disposed at a front end thereof. Additionally, the ski-member 12 has two slope members 20 which are defined by the cutout front opening 18. While the tops of the tips of the skis are flat, the tips of the skis are curved to aid in guiding the receptacle 10 as will be described below.

It is contemplated that two ski-members 12 could be attached to receptacle 10, or that ski-members 12 or separate ski-members 12 could be attached in various positions of bottom surface 16, while still achieving the desired results of the invention. Alternatively, the front opening 18 of the ski member 12 could be a hole bored through a single ski-member 12. This opening 18 could also be omitted and the ski-member 12 may be of a transparent or translucent material, such as plastic. As will later be described, this opening 18 or a transparent material will enable light or a laser from a barcode reader to scan a barcode on media over which the ski-members 12 slide.

The receptacle 10 is further defined by hand-held body 22. The hand-held body 22 has an upper surface 24 with an elongated hole 26 therethrough. In addition, the hand-held body 22 includes a concave surface 28 on opposing side surfaces thereof (only one side being shown). The concave surfaces 28 are defined by a rim 30 which extends along peripheral surfaces of three sides of the body 22. Of course, all four sides or less than all sides of the body 22 could have this rim 30.

The hand-held body 22 is generally defined by two half portions 32. The two half portions 32 are retainably held together by two screws 34 disposed on a front end portion of the hand-held body, or alternatively, the half portions 32 may be retainably held together by any well known retaining method, e.g., glue, clamping or the like. Alternatively, the hand-held body 22 of the present invention may be constructed as a single, one-piece unit as opposed to the half portions 32.

Figure 2:
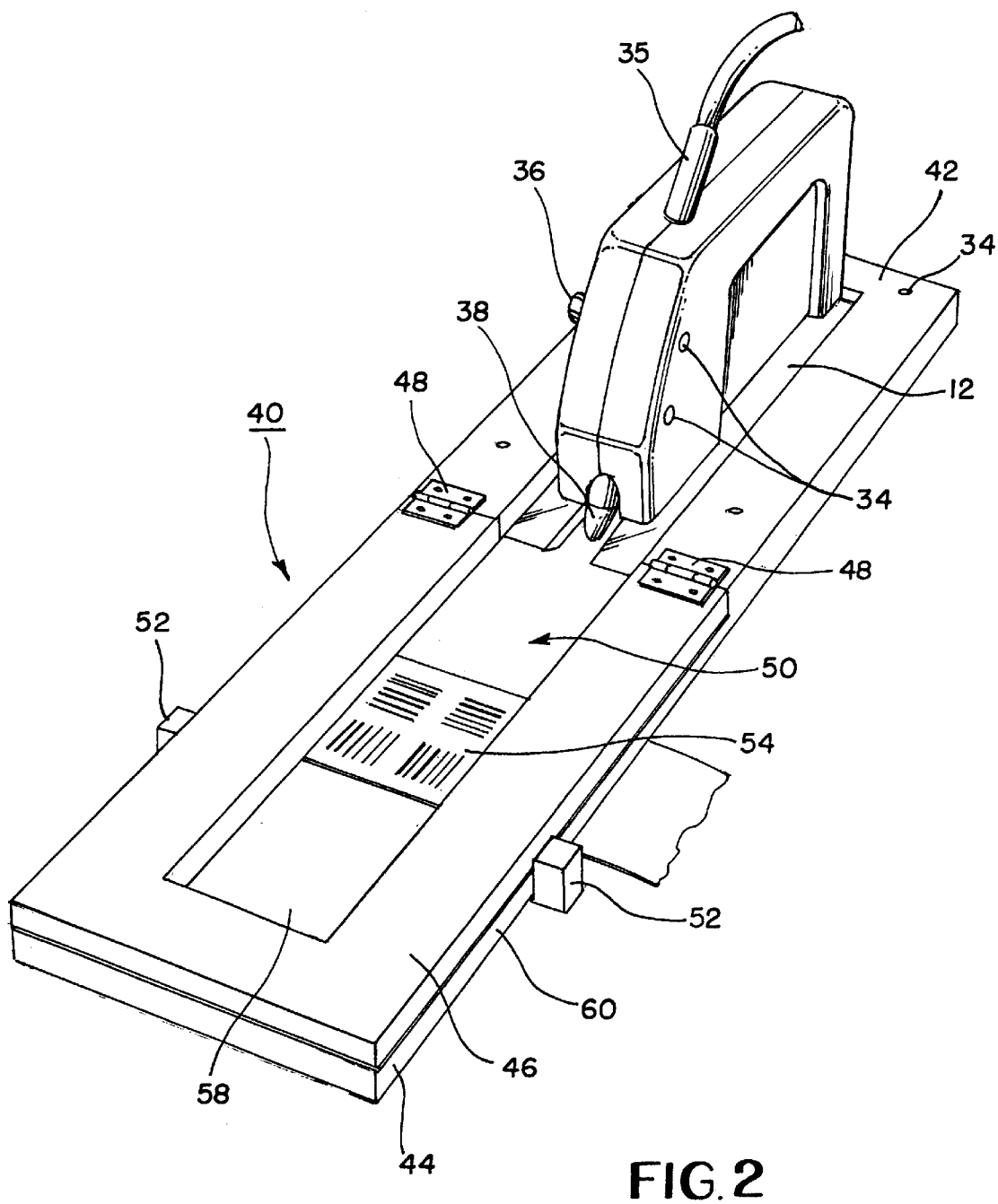
FIG. 2 shows a perspective view of the hand-held barcode reader apparatus with the barcode reader disposed in a runway of a base member of the present invention.

The elongated hole 26 is bored or otherwise formed through the hand-held body 22 at a predetermined angle. Inserted into the elongated hole 26, is a barcode wand or reader 35 as shown in FIG. 2. The barcode wand 35 is fastened in receptacle 10 by securing member 36, or alternatively the barcode wand 35 is retainably secured at a predetermined height in the elongated hole 26 by a taper (not shown) of the elongated hole 26. Moreover, the barcode wand 35 and receptacle 10 could be formed as a single non-detachable separable unit. A barcode wand tip 38 extends through the elongated hole 26 and emerges at an exit side 56 thereof. The laser, light or the like (not shown) generated by the barcode wand tip 38 passes unobstructed through the cutout front opening 18. If transparent ski members 12 are used, this opening 18 can be omitted and the laser or light would pass directly therethrough. Alternatively, the receptacle 10 of present invention may be designed to permanently incorporate the required electronics of a barcode wand 35, thus providing a one piece contiguous unit failing to require the insertion of a barcode wand 35 into an elongated hole 26, as described above.

Figure 3:
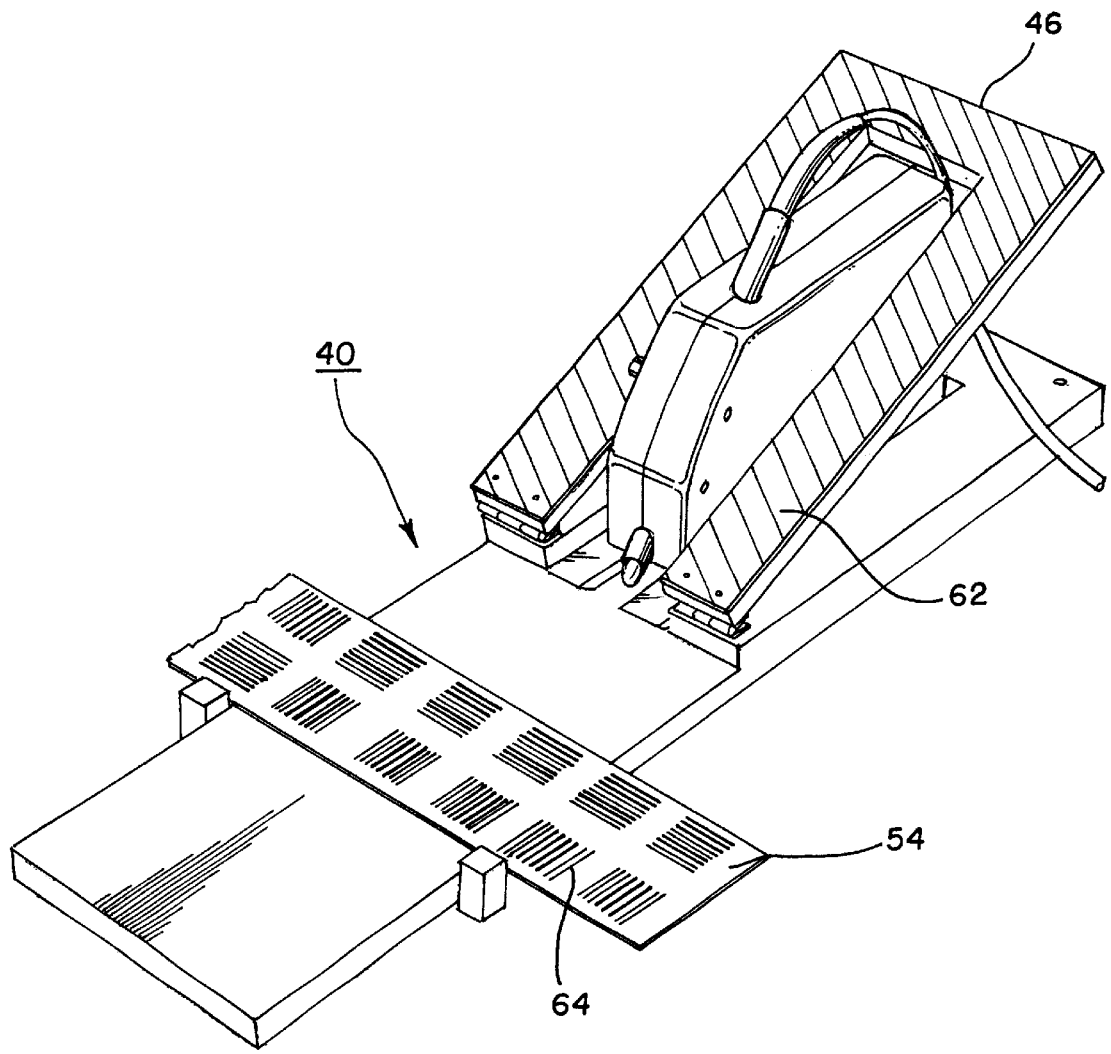
FIG. 3 shows a perspective view of the hand-held barcode reader receptacle apparatus of the present invention with a flappable member of the base member in an open position.

The receptacle 10, has an autonomous base member 40, as seen in FIGS. 2 and 3. The base member 40 has upper and lower members, 42 and 44 respectively, where the upper member 42 is securably attached to a surface portion of the lower member 44. A flappable member 46 is attached to the upper member 42 with two hinges 48. Of course, any surface device could be used for affixing member 46 to the upper member 42 or to the lower member 44. Both the upper member 42 and the flappable member 46 have a concurrent runway 50 defined by an opening therethrough. The surface of runway 50 is defined by an upper top surface 58 of lower member 44. Of course, the opening for the runway 50 could also extend into the lower member 44. Two stays 52 are aligned along lateral opposing sides 60 of the lower member 44. While two stays 52 are shown, only a single stay, a plurality of stays or other suitable device for holding a media with barcode thereon could be used.

As shown in FIG. 3, the flappable member 46 is pivotable to an open position. On the underside of the flappable member 46 a tacky surface 62 is provided. This surface 62 could be composed of various well known compounds which will grip an item without leaving a residue. The tacky surface 62 prevents lateral movement of a media 54 aligned along the upper top surface of the lower member. Moreover, the stays 52 prevent the media 54 from moving in a longitudinal direction with respect to base member 40. As will now be described, media 54 can be releasably held by the base member 40. Of course, the stays 52 and/or tacky surface 62 could be omitted if so desired.

With the hand-held barcode reader receptacle 10 the media 54 can be scanned while it is retainably held by the flappable member 46 of base member 40. The method of the present invention includes the steps of placing media 54 having barcode indicia on the lower member 44 when the flappable member 46 is in the open position of FIG. 3. The receptacle 10 is also in an out-of-the-way position as shown, or receptacle 10 can simply be removed from base member 40. The flappable member 46 of the upper member 42 is then closed to hold the media 54 in place. If necessary, a barcode wand 35 can be placed in the hand-held barcode reader receptacle 10; and the hand-held barcode reader receptacle 10 will be placed on the runway 50. The hand-held barcode reader receptacle 10 is slid in a forward direction along the runway 50 such that the barcode reader 35 can read the media 54. The flappable member 46 holds the media 54 in position. Also, the stays 52 and tacky surface 62, if used, will help hold the media 54 in position.

The method further comprises the step of tightening a securing member 36 to retainably hold the barcode wand 35 at a predetermined position in receptacle 10 such that the barcode reader 35 will be in a set position above the media 54. The method further comprises the step of opening the hinged flappable member 46 upon completion of one read of the barcode indicia 64, shifting the media 54 and closing the hinged flappable member 46 to allow a subsequent read of the media 54. Of course the base member 40 could be designed to permit lateral sliding of media 54 while the flappable member 46 is closed. Also, automatic incrementing devices could be used to advance the media 54. The above-identified steps are repeated until each barcode indicia 64 disposed on the media 54 is read.

With the hand-held barcode reader receptacle 10, and the base member 40, a media 54 having barcode indicia 64 disposed thereon is reliably read in an efficient manner. Advantageously, the apparatus also allows superior scanning and reading ability of the media 54 with barcode indicia 64 disposed thereon while maintaining an environment which may be relied upon to generate consistent test results relating to the scanned barcode indicia 64.

In particular, the apparatus and method of the present invention allow reliable readability of barcode indicia 64 disposed on a media 54 while maintaining a barcode wand 35, or the like, at a predetermined distance and angle above the media 54. Lateral wobbling of the barcode wand 35 is prevented. Therefore, in a testing environment where it is desirable to detect the readability of various barcode indicia 64, the size and the print quality thereof, it is possible to obtain a test platform which is consistent over numerous reads of barcode indicia 64.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A hand-held barcode reader apparatus comprising:
a receptacle, the receptacle having a hand-held body;
an elongated hole in the hand-held body for receiving a scanning member therein; and
a ski-member attachable to the hand-held body, said ski-member having a bottom surface, the hand-held body being slidably movable along a support surface, said bottom surface of the ski-member laterally supporting the hand-held body to prevent wobbling of the hand-held body relative to the support surface during sliding thereof, whereby said ski-member supportably holds said hand-held body in an essentially level position.

2. The hand-held barcode reader apparatus of claim 1, further comprising a base member having a runway member, said runway member having essentially an equal width as a width of said ski-member and receivably allowing said ski-member to slide therein, whereby said runway member guides the hand-held body during sliding movement to prevent lateral movement of said ski-member.

3. The hand-held barcode reader apparatus of claim 2, wherein said base member includes at least one hinge disposed thereon and a flappable member, said at least one hinge pivotally fastening said flappable member to said base member.

4. The hand-held barcode reader apparatus of claim 3, wherein said base member includes an upper member to which the flappable member is pivotally attached by at least one hinge, and at least one stay member being positioned along a lateral side of a lower member of the base, said at least one stay member aligning a media placed between the flappable member and the lower member and over which the ski-member is slidable.

5. The hand-held barcode reader receptacle apparatus of claim 4, wherein at least a portion of an under surface of said flappable member is tacky, whereby said tacky under surface holds a media between said flappable member and said lower member.

6. The hand-held barcode reader apparatus of claim 1, wherein said elongated hole has a longitudinal axis which is angled relative to the ski-member.

7. The hand-held barcode reader apparatus of claim 6, wherein said hand-held body includes a securing member being integral with said hand-held body, said securing member being adaptable in securing the scanning member in the elongated hole at a predetermined position.

8. The hand-held barcode reader apparatus of claim 6, wherein said ski-member has a cutout portion therein, the cutout portion being aligned with the elongated hole in the hand-held body such that the ski-member does not interfere with a tip of a barcode reader and a laser or light beam exuding therefrom.

9. The hand-held barcode reader apparatus of claim 8, wherein said ski-member has two front-end portions defined by said cutout portion, said two front-end portions being sloped at ends thereof.

10. The hand-held barcode reader apparatus of claim 6, wherein said elongated hole is tapered along a length thereof, whereby said taper retainably holds the scanning member at a predetermined position in the elongated hole.

11. The hand-held barcode reader apparatus of claim 1, wherein said hand-held body includes a concave surface on at least one side portion of said hand-held body.

12. The hand-held barcode reader apparatus according to claim 1, wherein the scanning member is a barcode reader.

13. A method of reading barcode indicia comprising the steps of:
providing a base member with a lower member and a flappable member pivotally mounted thereon;
placing a media having barcode indicia thereon on the lower member of the base member the flappable member being in an open position;
closing the flappable member of said base member to retainably hold said media in place between the lower member and the flappable member;
placing a barcode reader apparatus on a runway surface disposed in said base member;
sliding said barcode reader apparatus along said runway surface to read said media; and
reading the barcode indicia with the barcode reader apparatus during sliding of the barcode reader apparatus long the runway surface.

14. The method of reading barcode indicia according to claim 13, further comprising the steps of:
providing a receptacle with a elongated hole therein; and
detachably mounting a barcode reader in the elongated hole of the receptacle, the receptacle and barcode reader forming the barcode reader apparatus.

15. The method of reading barcode indicia according to claim 13, further comprising the steps of:
opening said flappable member upon completion of at least one read of said barcode indicia;
shifting said media relative to the base member; and
closing said flappable member to allow a subsequent read of said media.

16. The method of reading barcode indicia according to claim 15, further comprising the step of repeating the steps of opening, shifting and closing until each barcode indicia disposed on said media is read.

17. The method of reading barcode indicia according to claim 13, further comprising the steps of:
maintaining a height of the barcode reader apparatus from the base member during the step of sliding; and
maintaining an angle between the barcode reader apparatus and the media during the step of sliding to thereby improve accuracy of the reading of the barcode indicia.

18. The method or reading barcode indicia according to claim 13, further comprising the step of shifting the media relative to the base member while the flappable member is closed to thereby present a new barcode indicia on the media to be read by the barcode reader apparatus.

19. A base member for a hand-held barcode reader receptacle apparatus comprising:
a lower member;
an upper member being mounted on said lower member; and
a flappable member pivotally attached to said upper member, at least said flappable member and said upper member having an opening formed therein which forms a runway for guiding movement of a barcode reader.

20. The base member of claim 19, wherein the opening is disposed in a longitudinal direction of the base member.

21. The base member of claim 20, further comprising at least one stay member disposed along at least one lateral edge of said lower member, and a media being engagable with the at least one stay member at a predetermined position relative to said lower member.

22. The base member of claim 21, wherein said at least one stay member includes two stay members laterally placed on opposing sides of said lower base member.

23. The base member of claim 19, wherein an under surface of said flappable member is tacky, whereby said tacky under surface holds a media when said flappable member is in abutment with said lower base member.

* * * * *